US010180690B2

(12) United States Patent
Peterson et al.

(10) Patent No.: US 10,180,690 B2
(45) Date of Patent: Jan. 15, 2019

(54) SYSTEMS AND METHODS FOR MITIGATION OF OSCILLATION IN A CLOSED-LOOP SYSTEM

(71) Applicant: Dell Products L.P., Round Rock, TX (US)

(72) Inventors: Chris E. Peterson, Austin, TX (US); Dominick A. Lovicott, Round Rock, TX (US); Anil V. Rao, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 265 days.

(21) Appl. No.: 15/076,930

(22) Filed: Mar. 22, 2016

(65) Prior Publication Data

US 2017/0277207 A1 Sep. 28, 2017

(51) Int. Cl.
*G06F 1/20* (2006.01)
*F16F 15/00* (2006.01)
*G05B 11/42* (2006.01)
*G05D 19/02* (2006.01)

(52) U.S. Cl.
CPC .......... *G05D 19/02* (2013.01); *F16F 15/002* (2013.01); *G05B 11/42* (2013.01); *G06F 1/20* (2013.01)

(58) Field of Classification Search
CPC ..... G05D 19/02; H05K 7/20836; G05B 11/42
USPC .................................................... 700/41–43
See application file for complete search history.

(56) References Cited

U.S. PATENT DOCUMENTS

| 4,250,543 | A | * | 2/1981 | Smith | H03K 17/667 700/42 |
| 4,669,040 | A | * | 5/1987 | Pettit | G05B 15/02 318/610 |
| 5,748,467 | A | * | 5/1998 | Qin | G05B 13/0275 700/41 |
| 6,445,962 | B1 | * | 9/2002 | Blevins | G05B 11/42 700/37 |
| 7,331,532 | B2 | * | 2/2008 | Currie | H05K 7/20209 236/49.3 |
| 8,644,993 | B1 | * | 2/2014 | Craft | F04D 15/0066 137/286 |
| 8,868,250 | B2 | * | 10/2014 | Jensen | G05B 11/16 361/676 |
| 2016/0033972 | A1 | | 2/2016 | Shabbir et al. | |

(Continued)

*Primary Examiner* — Sean Shechtman
(74) *Attorney, Agent, or Firm* — Jackson Walker LLP; Christopher J. Rourk (57) ABSTRACT

In accordance with embodiments of the present disclosure, a system may include a feedback controller and logic. The feedback controller may be configured to, based on a setpoint value and a measured process value calculate an error between the setpoint value and the measured process value and generate a driving signal based on the error. The logic may be configured to determine if oscillation is present in the driving signal, determine if oscillation is present in an operational parameter other than the driving signal such that oscillation of such operational parameter may cause oscillation in the measured process value, determine if oscillation present in the driving signal is correlated with oscillation present in the operational parameter, and adjust a control parameter of the feedback controller responsive to determining that oscillation present in the driving signal is not correlated to oscillation present in the operational parameter.

17 Claims, 3 Drawing Sheets

(56) References Cited

U.S. PATENT DOCUMENTS

2016/0041533 A1* 2/2016 Ueda .................. G05B 19/19
                                                       700/280
2016/0077557 A1   3/2016 North et al.

* cited by examiner

SYSTEMS AND METHODS FOR MITIGATION OF OSCILLATION IN A CLOSED-LOOP SYSTEM

TECHNICAL FIELD

The present disclosure relates in general to information handling systems, and more particularly to mitigation of oscillation in a closed-loop system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

Temperature control in an information handling system with air movers often involves use of a closed-loop feedback system that alters air mover speed or throttles component performance in response to a sensed temperature in the information handling system. A controller of the closed-loop feedback system is typically tuned to account for known system interactions. However, even well-tuned controllers may suffer from undesirable oscillation which may cause psychoacoustical annoyance to a user of the information handling system, leading to bad customer experience.

Oscillation may have numerous sources. One source of oscillation may be an unstable controller response, in which a response of a controller continually overcompensates, then undercompensates a desired temperature or other parameter setpoint. Another source of oscillation may be an oscillating workload of information handling system components, which causes an oscillating temperature, which in turn causes an oscillating blower speed response.

SUMMARY

In accordance with the teachings of the present disclosure, the disadvantages and problems associated with oscillation in a closed-loop system may be substantially reduced or eliminated.

In accordance with embodiments of the present disclosure, a system may include a feedback controller and logic. The feedback controller may be configured to, based on a setpoint value and a measured process value calculate an error between the setpoint value and the measured process value and generate a driving signal based on the error. The logic may be configured to determine if oscillation is present in the driving signal, determine if oscillation is present in an operational parameter other than the driving signal such that oscillation of such operational parameter may cause oscillation in the measured process value, determine if oscillation present in the driving signal is correlated with oscillation present in the operational parameter, and adjust a control parameter of the feedback controller responsive to determining that oscillation present in the driving signal is not correlated to oscillation present in the operational parameter.

In accordance with these and other embodiments of the present disclosure, a method may include determining if oscillation is present in a driving signal generated by a feedback controller configured to generate the driving signal based on an error between a set point value and a measured process value, determining if oscillation is present in an operational parameter other than the driving signal such that oscillation of such operational parameter may cause oscillation in the measured process value, determining if oscillation present in the driving signal is correlated with oscillation present in the operational parameter, and adjusting a control parameter of the feedback controller responsive to determining that oscillation present in the driving signal is not correlated to oscillation present in the operational parameter.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to determine if oscillation is present in a driving signal generated by a feedback controller configured to generate the driving signal based on an error between a set point value and a measured process value, determine if oscillation is present in an operational parameter other than the driving signal such that oscillation of such operational parameter may cause oscillation in the measured process value, determine if oscillation present in the driving signal is correlated with oscillation present in the operational parameter, and adjust a control parameter of the feedback controller responsive to determining that oscillation present in the driving signal is not correlated to oscillation present in the operational parameter.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
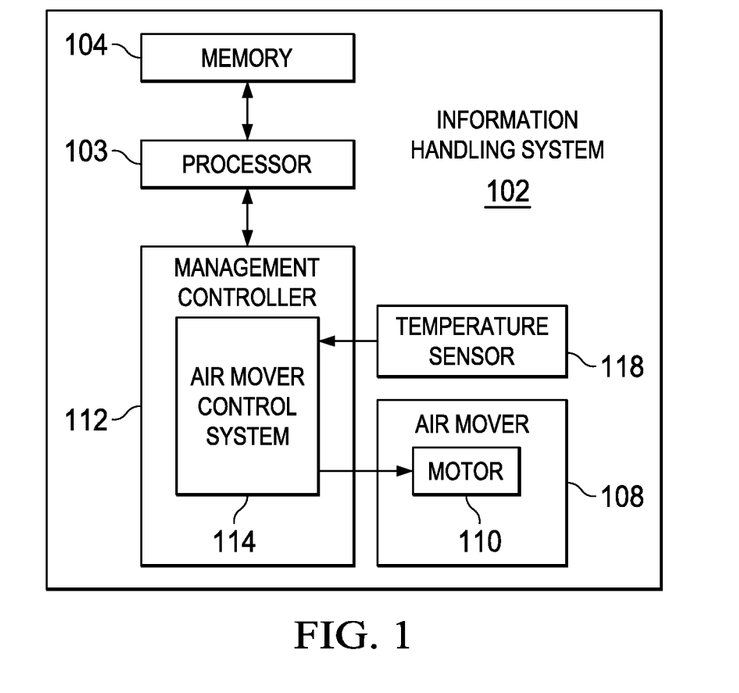
FIG. 1 illustrates a block diagram of an example information handling system, in accordance with the present disclosure.
Figure 2:
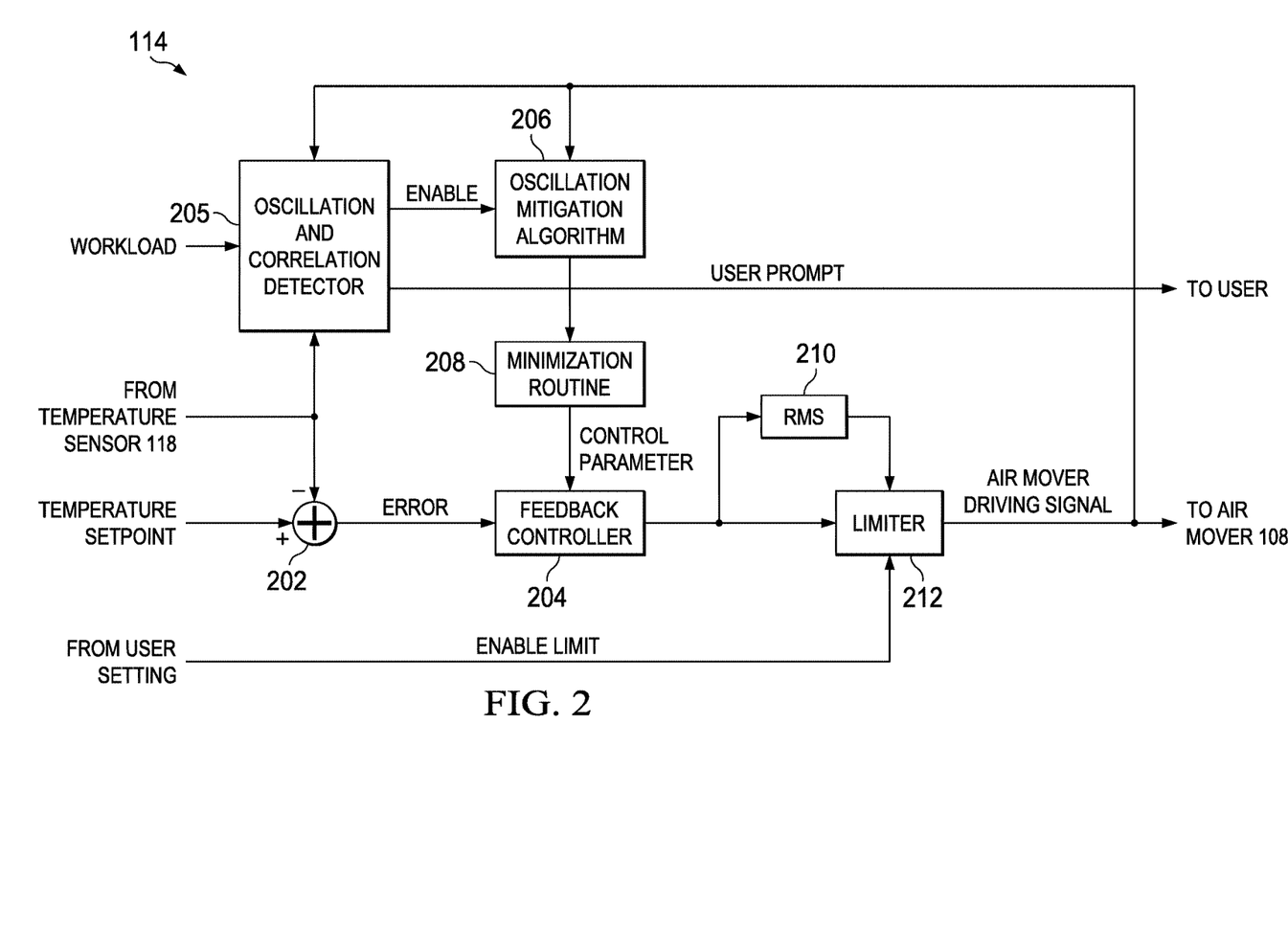
FIG. 2 illustrates a block diagram of selected components of an example air mover control system, in accordance with the present disclosure.
Figure 3:
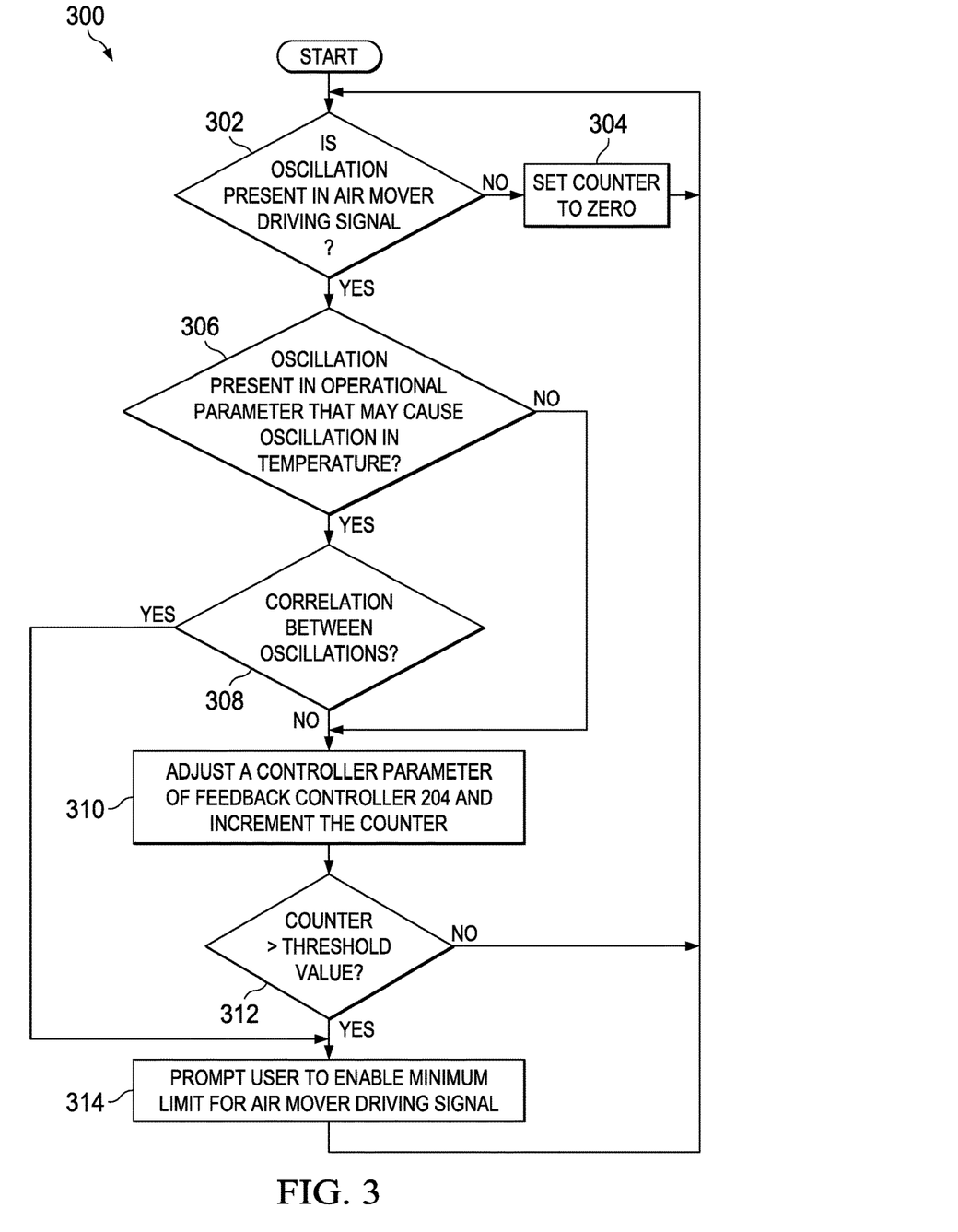
FIG. 3 illustrates a flow chart of an example method for mitigation of oscillation in an air mover control system, in accordance with the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104, an air mover 108, a management controller 112, and a temperature sensor 118.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. Air mover 108 may include any mechanical or electro-mechanical system, apparatus, or device operable to move air and/or other gases in order to cool information handling resources of information handling system 102. In some embodiments, air mover 108 may comprise a fan (e.g., a rotating arrangement of vanes or blades which act on the air). In other embodiments, air mover 108 may comprise a blower (e.g., centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by an air mover control signal (e.g., a pulse-width modulation signal) communicated from air mover control system 114 of management controller 112. In operation, air mover 108 may cool information handling resources of information handling system 102 by drawing cool air into an enclosure housing the information handling resources from outside the chassis, expel warm air from inside the enclosure to the outside of such enclosure, and/or move air across one or more heat sinks (not explicitly shown) internal to the enclosure to cool one or more information handling resources.

Management controller 112 may comprise any system, device, or apparatus configured to facilitate management and/or control of information handling system 102 and/or one or more of its component information handling resources. Management controller 112 may be configured to issue commands and/or other signals to manage and/or control information handling system 102 and/or its information handling resources. Management controller 112 may comprise a microprocessor, microcontroller, DSP, ASIC, field programmable gate array ("FPGA"), EEPROM, or any combination thereof. Management controller 112 also may be configured to provide out-of-band management facilities for management of information handling system 102. Such management may be made by management controller 112 even if information handling system 102 is powered off or powered to a standby state. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

As shown in FIG. 1, management controller 112 may include an air mover control system 114. Air mover control system 114 may include any system, device, or apparatus configured to receive one or more signals indicative of one or more temperatures within information handling system 102 (e.g., one or more signals from one or more temperature sensors 118), and based on such signals, calculate an air mover driving signal (e.g., a pulse-width modulation signal) to maintain an appropriate level of cooling, increase cooling, or decrease cooling, as appropriate, and communicate such air mover driving signal to air mover 108. In some embodiments, air mover control system 114 may include a program of instructions (e.g., software, firmware) configured to, when executed by a processor or controller integral to management controller 112, carry out the functionality of air mover control system 114. The functionality of air mover control system 114 is described in greater detail below with respect to FIG. 2.

A temperature sensor 118 may be any system, device, or apparatus (e.g., a thermometer, thermistor, etc.) configured to communicate a signal to air mover control system 114 indicative of a temperature within information handling system 102.

In addition to processor 103, memory 104, air mover 108, management controller 112, and temperature sensor 118, information handling system 102 may include one or more other information handling resources. In addition, for the sake of clarity and exposition of the present disclosure, FIG. 1 depicts only one air mover 108 and temperature sensor 118. In embodiments of the present disclosure, information handling system 102 may include any number of air movers 108 and temperature sensors 118.

FIG. 2 illustrates a block diagram of an example air mover control system 114, in accordance with the present disclosure. As shown in FIG. 2, air mover control system 114 may include a summer 202, a feedback controller 204, an oscillation and correlation detector 205, an oscillation mitigation algorithm 206, a minimization routine 208, a root-mean-square (RMS) calculator 210, and a limiter 212. Such components of air mover control system 114 may be implemented in hardware, software, firmware, or any combination thereof.

Summer 202 may calculate an error between a temperature setpoint (e.g., representing a maximum operating temperature) and a measured temperature (e.g., as indicated from a signal communicated from temperature sensor 118) to generate an error signal which is communicated to feedback controller 204.

Feedback controller 204 may comprise any system, device, or apparatus configured to, based on the error signal generated by summer 202, generate an air mover driving signal. In some embodiments, feedback controller 204 may be implemented with a proportional-integral-differential (PID) controller. In some embodiments, an air mover driving signal may comprise a pulse-width modulation (PWM) signal, in which the width of a pulse of a periodic square wave signal may be indicative of a desired operating velocity for motor 110 of air mover 108.

Oscillation and correlation detector 205 may comprise any system, device, or apparatus configured to, based on an analysis of the air mover driving signal, determine if oscillation is present in the air mover driver signal. Such monitoring for oscillation may be achieved in any suitable manner. For example, oscillation may be detected by analyzing slopes of the air mover driving signal for a period of time in order to determine extrema of the air mover driver signal (e.g., peaks and valleys). Such extrema may be incrementally compared against different oscillation periods for match.

Oscillation and correlation detector 205 may also be configured to determine if oscillation is present in an operational parameter of information handling system 102 other than air mover speed that may cause oscillation of temperature. In some embodiments, such parameter may be indicative of an oscillating characteristic within information handling system 102 which may give rise to an oscillating temperature, such as a power consumption by information handling resources (e.g., processor 103) of information handling system 102, an input power to information handling resources (e.g., processor 103) of information handling system 102, a utilization rate of information handling resources (e.g., processor 103) of information handling system 102, and/or another operational parameter indicative of a workload of the information handling resources of information handling system 102. In order to determine if oscillation is present in the operational parameter, such operational parameter may be received by management controller 112 (e.g., via an Inter-Integrated Circuit bus) from a source of such operational parameter (e.g., processor 103, a power supply unit, etc.) and stored in a time-indexed buffer (e.g., embodied as computer-readable media integral to or otherwise accessible to management controller 112). Oscillation and correlation detector 205 may then analyze such buffered data in any suitable manner to determine if such data indicates presence of oscillation in the operational parameter represented by the buffered data.

If oscillation is present in the air mover driver signal and oscillation is present in the operational parameter, oscillation and correlation detector 205 may determine if such oscillations are correlated to one another. Such determination of correlation may be made in any suitable manner. For example, in some embodiments, Welch's averaged, modified, periodogram method may be used, in order to estimate a magnitude squared coherence estimate of vectors (operational parameter, air mover control signal) versus frequency, and then compare such coherence spectrum to a predefined threshold, which if met or exceeded, indicates that oscillations are correlated.

If oscillation is present in the air mover driving signal and such oscillation is not correlated to oscillation in the operational parameter, oscillation and correlation detector 205 may enable oscillation mitigation algorithm 206. Oscillation mitigation algorithm 206 may include any system, device, or apparatus configured to estimate a period and/or an amplitude of oscillation of the air mover driving signal and pass such estimates to minimization routine 208.

Minimization routine 208 may include any system, device, or apparatus configured to adjust one or more control parameters of feedback controller 204 based on a period and/or an amplitude of oscillation of the air mover driving signal and then iteratively determine the effect of such adjustment in minimizing oscillation of the air mover driving signal and make further adjustments to the one or more control parameters of feedback controller 204 until such time as the oscillation is reduced to a desired level. In general terms, minimization routine 208 may increase or decrease responsiveness of feedback controller 204 to minimize instability of feedback controller 204. Such responsiveness may be controlled by controlling gain parameters of feedback controller 204. For example, in embodiments in which feedback controller 204 is a PID controller, feedback controller 204 can be made to become more responsive by increasing its derivative gain parameter or less responsive by increasing its integral gain parameter and/or proportional gain parameter. In some embodiments, such methodology could implement gain scheduling or self-tuning regulation concepts known within control theory. As a specific example, minimization routine 208 could perform gain scheduling by storing predefined responses to oscillation. As another specific example, minimization routine 208 could perform self-tuning regulation to minimize a measurable oscillation parameter, such as amplitude.

If oscillation is present in the air mover driving signal and such oscillation is correlated to the operational parameter, oscillation and correlation detector 205 may cause a prompt (e.g., via a user interface) to an administrator or other user of information handling system 102 to enable a limit on the air mover driving signal. In some embodiments, a user may only be permitted to enable such a limit if oscillation is present in the air mover driving signal and such oscillation is correlated to oscillation in the operational parameter. If the user enables the limit on the air mover driving signal, limiter 212 may be enabled to place a lower limit to the air mover driving signal communicated to air mover 108. On the other hand, if the user does not enable the limit on the air mover driving signal, the air mover driving signal generated by feedback controller 204 may pass to air mover 108 without limiting.

Limiter 212 may set a minimum limit for the air mover driving signal based on a calculation by RMS calculator 210 of an RMS value of prior oscillating values of the air mover driving signal. Such minimum limit may reduce or eliminate oscillation as feedback controller 204 may be restricted from overcompensating during reduction of air mover speed in response to decreased temperature, which in turn may reduce the need over time for feedback controller 204 to overcompensate during increase of air mover speed in response to increased temperatures. In some embodiments, air mover control system 106 may include a mechanism to deassert the enabling of limiter 212 in order to again allow air mover speeds below the limit set by limiter 212. For example, in some embodiments, air mover control system 106 may deassert the enabling of limiter 212 in response to input power and/or resource utilization decreasing below a threshold value.

FIG. 3 illustrates a flow chart of an example method 300 for mitigation of oscillation in air mover control system 106, in accordance with the present disclosure. According to one embodiment, method 300 may begin at step 302. As noted above, teachings of the present disclosure may be implemented in a variety of configurations of information handling system 102 and/or air mover control system 114. As such, the preferred initialization point for method 300 and the order of the steps comprising method 300 may depend on the implementation chosen.

At step 302, oscillation and correlation detector 205 may monitor an air mover driving signal to determine whether oscillation is present in the air mover driving signal. If oscillation is present, method 300 may proceed to step 306. Otherwise, method 300 may proceed to step 304.

At step 304, in response to no detection of oscillation of the air mover driving signal, oscillation and correlation detector 205 may set a counter value to zero. As shown in more detail below, such counter value may indicate a number of times that minimization routine 208 has attempted to reduce oscillation without eliminating oscillation. After completion of step 304, method 300 may proceed again to step 302.

At step 306, in response to detection of oscillation of the air mover driving signal, oscillation and correlation detector 205 may monitor an operational parameter of information handling system 102 other than air mover speed that may cause oscillation of temperature if such operational parameter is also oscillating and determine if such operational parameter has oscillation. If oscillation of the operational parameter is present, method 300 may proceed to step 308. Otherwise, method 300 may proceed to step 310.

At step 308, in response to detection of oscillation of the operational parameter, oscillation and correlation detector 205 may determine if oscillation in the air mover driving signal and the operational parameter are correlated. If oscillation in the air mover driving signal and the operational parameter are correlated, method 300 may proceed to step 310. Otherwise method 300 may proceed to step 314.

At step 310, in response to detection of oscillation of the air mover driving signal which is not correlated with oscillation of the operational parameter, minimization routine 208 may adjust a controller parameter of feedback controller 204 and increment the counter.

At step 312, if the counter exceeds a threshold value indicative of a maximum number of times that minimization routine 208 should attempt to minimize oscillation of the air mover driving signal, method 312 may proceed to step 314. Otherwise, method 300 may proceed again to step 302.

At step 314, air mover control system 114 may prompt a user of information handling system 102 to enable a minimum limit for the air mover driving signal and may limit the air mover driving signal to a minimum value (e.g., determined by RMS calculator 210) if the user chooses to enable such limiting. After completion of step 314, method 300 may proceed again to step 302.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102, air mover control system 114, or any other system operable to implement method 300. In certain embodiments, method 300 may be implemented partially or fully in software and/or firmware embodied in computer-readable media.

Although the foregoing discussion contemplated application systems and methods for closed-loop control to operation of an air mover, similar methods and systems may be generalized and applied to other closed loop controls. For example, such similar methods and systems may be applied to generate a driving signal to any appropriate plant or component based on any measured process value other than a measured temperature (and/or other operational parameters the oscillation of which may lead to oscillation of the measured process value) and a setpoint value other than a setpoint temperature.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
   a feedback controller configured to, based on a setpoint value, a measured process value, and a control parameter:
   calculate an error between the setpoint value and the measured process value; and
   generate a driving signal based on the error; and
   control an air mover based on the driving signal; and
   logic configured to:
   determine if oscillation is present in the driving signal;
   determine if oscillation is present in an operational parameter other than the driving signal such that oscillation of such operational parameter may cause oscillation in the measured process value;
   determine if oscillation present in the driving signal is correlated with oscillation present in the operational parameter; and
   adjust the control parameter of the feedback controller responsive to determining that oscillation present in the driving signal is not correlated to oscillation present in the operational parameter;
   wherein the operational parameter comprises one of an input power to at least one system component cooled by the air mover and a utilization rate of the at least one system component cooled by the air mover.

2. The system of claim 1, wherein the logic is further configured to:
   prompt a user to enable a minimum limit on the driving signal responsive to determining that oscillation present in the driving signal is not correlated to oscillation present in the operational parameter; and
   cause the minimum limit to be placed on the driving signal responsive to the user indicating enabling the minimum limit.

3. The system of claim 1, wherein the control parameter comprises a controller gain of the feedback controller.

4. The system of claim 1, wherein the feedback controller is a proportional-integral-differential controller, and the control parameter comprises one of a proportional gain, an integral gain, and a differential gain of the feedback controller.

5. The system of claim 1, wherein the setpoint value is a maximum temperature and the measured process value is a measured temperature.

6. The system of claim 1, wherein the driving signal is a signal for controlling a speed of an air mover.

7. The system of claim 6, wherein the setpoint value is a maximum temperature and the measured process value is a measured temperature, and the feedback controller is configured to control the speed to maintain the measured temperature below the maximum temperature.

8. A method comprising:
   determining if oscillation is present in a driving signal generated by a feedback controller configured to generate the driving signal based on a control parameter and an error between a set point value and a measured process value;
   controlling an air mover based on the driving signal;
   determining if oscillation is present in an operational parameter other than the driving signal such that oscillation of such operational parameter may cause oscillation in the measured process value;
   determining if oscillation present in the driving signal is correlated with oscillation present in the operational parameter; and
   adjusting the control parameter of the feedback controller responsive to determining that oscillation present in the driving signal is not correlated to oscillation present in the operational parameters;
   wherein the operational parameter comprises one of an input power to at least one component cooled by the air mover and a utilization rate of the at least one component cooled by the air mover.

9. The method of claim 8, further comprising:
   prompting a user to enable a minimum limit on the driving signal responsive to determining that oscillation present in the driving signal is not correlated to oscillation present in the operational parameter; and
   causing the minimum limit to be placed on the driving signal responsive to the user indicating enabling the minimum limit.

10. The method of claim 8, wherein the control parameter comprises a controller gain of the feedback controller.

11. The method of claim 8, wherein the feedback controller is a proportional-integral-differential controller, and the control parameter comprises one of a proportional gain, an integral gain, and a differential gain of the feedback controller.

12. The method of claim 8, wherein the setpoint value is a maximum temperature and the measured process value is a measured temperature.

13. The method of claim 8, wherein the driving signal is a signal for controlling a speed of an air mover.

14. The method of claim 13, wherein the setpoint value is a maximum temperature and the measured process value is a measured temperature, and the feedback controller is configured to control the speed of the air mover to maintain the measured temperature below the maximum temperature.

15. An article of manufacture comprising:
a non-transitory computer-readable medium; and
computer-executable instructions carried on the computer-readable medium, the computer-executable instructions readable by a processor, the computer-executable instructions, when read and executed, for causing the processor to:
determine if oscillation is present in a driving signal generated by a feedback controller configured to generate the driving signal based on a control parameter and an error between a set point value and a measured process value;
control a plant based on the driving signal;
determine if oscillation is present in an operational parameter other than the driving signal such that oscillation of such operational parameter may cause oscillation in the measured process value;
determine if oscillation present in the driving signal is correlated with oscillation present in the operational parameter;
adjust the control parameter of the feedback controller responsive to determining that oscillation present in the driving signal is not correlated to oscillation present in the operational parameter;
prompt a user to enable a minimum limit on the driving signal responsive to determining that oscillation present in the driving signal is not correlated to oscillation present in the operational parameter; and
cause the minimum limit to be placed on the driving signal responsive to the user indicating enabling the minimum limit.

16. The article of claim 15, wherein the control parameter comprises a controller gain of the feedback controller.

17. The article of claim 15, wherein the setpoint value is a maximum temperature, the measured process value is a measured temperature, and the driving signal is a signal for controlling a speed of an air mover.

\* \* \* \* \*